US010299254B2

(12) United States Patent
Lindoff et al.

(10) Patent No.: US 10,299,254 B2
(45) Date of Patent: May 21, 2019

(54) CONTROL CHANNEL FOR A RADIO ACCESS TECHNOLOGY

(71) Applicant: Telefonaktiebolaget LM Ericsson (publ), Stockholm (SE)

(72) Inventors: Bengt Lindoff, Bjarred (SE); Robert Baldemair, Solna (SE); Yngve Selen, Uppsala (SE); Anders Wallen, Ystad (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 60 days.

(21) Appl. No.: 15/115,595

(22) PCT Filed: Feb. 6, 2014

(86) PCT No.: PCT/EP2014/052326
§ 371 (c)(1),
(2) Date: Jul. 29, 2016

(87) PCT Pub. No.: WO2015/117653
PCT Pub. Date: Aug. 13, 2015

(65) Prior Publication Data
US 2017/0171853 A1 Jun. 15, 2017

(51) Int. Cl.
H04W 72/04 (2009.01)
H04W 28/02 (2009.01)
(Continued)

(52) U.S. Cl.
CPC ... *H04W 72/0413* (2013.01); *H04W 28/0268* (2013.01); *H04W 28/10* (2013.01);
(Continued)

(58) Field of Classification Search
None
See application file for complete search history.

(56) References Cited

U.S. PATENT DOCUMENTS 8,355,747 B1* 1/2013 West .................. H04W 76/15
455/552.1
2002/0071480 A1* 6/2002 Marjelund .............. H04W 8/22
375/141
(Continued)

FOREIGN PATENT DOCUMENTS

GB 2498878 A 7/2013
WO 2013086164 A1 6/2013
WO 2013086410 A2 6/2013

OTHER PUBLICATIONS

PCT International Search Report, dated Oct. 16, 2014, in connection with International Application No. PCT/EP2014/052326, all pages.
(Continued)

*Primary Examiner* — Saba Tsegaye
(74) *Attorney, Agent, or Firm* — Leffler Intellectual Property Law, PLLC

(57) ABSTRACT

The present disclosure proposes a general method for accessing a network when a wireless device, e.g., a user equipment, knows about a wireless network because it can e.g. measure on a cell and read its system information, but is unable to access it. The disclosure relates to transmitting uplink control messages relating to data received in a wireless device and in particular it relates a method, performed in a wireless device supporting a first radio access technology and a second radio access technology, of transmitting uplink control messages relating to data received in the wireless device. The method comprises receiving a configuration message defining in the first radio access technology, a Physical Fast Control Channel for transmission of uplink control messages relating to data received in the wireless device using the second radio access technology and transmitting uplink control messages relating to data received using the second radio access technology on the Physical Fast Control Channel. The proposed technology
(Continued)

also relates to methods of handling and receiving uplink control messages in radio network modules, and to a wireless device and radio networks modules for implementing the methods as well as to corresponding computer programs.

23 Claims, 10 Drawing Sheets

(51) Int. Cl.
*H04W 72/08* (2009.01)
*H04W 28/10* (2009.01)
*H04W 48/16* (2009.01)
*H04W 88/06* (2009.01)
*H04W 48/14* (2009.01)

(52) U.S. Cl.
CPC ....... *H04W 48/16* (2013.01); *H04W 72/0473* (2013.01); *H04W 72/082* (2013.01); *H04W 72/085* (2013.01); *H04W 48/14* (2013.01); *H04W 88/06* (2013.01)

(56) References Cited

U.S. PATENT DOCUMENTS

2011/0103323 A1* 5/2011 Wang .................... H04L 1/0026
370/329
2014/0036797 A1* 2/2014 Palanivelu .......... H04W 72/085
370/329

OTHER PUBLICATIONS

PCT Written Opinion, dated Oct. 16, 2014, in connection with International Application No. PCT/EP2014/052326, all pages.
Document 5D/TEMP/477 Rev 2: Detailed specifications of the terrestrial radio interfaces of International Mobile Telecommunications—Advanced (IMT-Advanced), Radiocommunication Study Groups, 10th Meeting of Working Party 5D, Are, Sweden, Apr. 6-13, 2011, 84 pages.
3GPP TSG RAN WG1 LTE Ad Hod, R1-061775, Cannes, France, Jun. 27-30, 2006, LG Electronics, L1/L2 signaling for reporting downlink channel quality information, 4 pages.
European Communication dated Sep. 17, 2018 in connection with European Application No. 14703345.0, 6 pages.

* cited by examiner

CONTROL CHANNEL FOR A RADIO ACCESS TECHNOLOGY

TECHNICAL FIELD

The proposed technology relates to transmitting uplink control messages relating to data received in a wireless device and in particular it relates to methods for using a radio access technology different from the radio access technology used for transmitting the data, for sending uplink control messages. The proposed technology also relates to methods of handling and receiving uplink control messages in radio network modules, and to a wireless device and radio networks modules for implementing the methods as well as to corresponding computer programs.

BACKGROUND

Long Term Evolution, LTE, is the fourth-generation, 4G, mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In a UTRAN and an E-UTRAN, a User Equipment, UE, is wirelessly connected to a Radio Base Station, RBS, commonly referred to as a Node B, NB, in UMTS, and as an evolved Node B, eNodeB or eNodeB, in LTE. An RBS or access node is a general term for a radio network node capable of transmitting radio signals to a user equipment, UE, and receiving signals transmitted by a user equipment.

The "Mobile and Wireless Communications Enablers for the Twenty-twenty, 2020, Information Society", METIS, is a project co-founded by the European Commission and is a consortium of 29 partners. The project objective is to respond to societal challenges for the year 2020 and beyond by laying the foundation for the next generation of the mobile and wireless communications system.

The frequencies being discussed for fifth generation, 5G, mobile communication systems in e.g. the METIS project, are much higher than what is commonly used for 3GPP accesses today—suggestions have been made for carrier frequencies >60 GHz.

Frequencies in the range 30 to 300 gigahertz are often referred to as Extremely high frequency, EHF, Radio waves in this frequency range have wavelengths from about ten to around one millimeter, giving it the name millimeter band or millimeter wave, sometimes abbreviated MMW or mmW.

Radio systems utilizing carrier frequencies in this range are typically less reliable than radio systems operating at lower frequencies, at least when it comes to mobile devices or devices in dynamic environments. This is mainly because EHF signals are associated with severe attenuation from, e.g., path loss, which is also why mmW systems tend to rely on beam forming to get decent link budgets. However, the available frequency spectrum is often plentiful at these high frequencies, enabling very high data rates; the latter being the typical motivation to look into mmW systems when very high user data rates is wanted.

Particularly beam forming in the uplink can be difficult for a mobile device, since just a small change in orientation can direct the beam in a very different direction. Further, traffic on a link is often asymmetric, i.e., downlink traffic tends to be larger in quantity than uplink traffic due to, e.g., downloading or streaming of large files.

Systems using mmW, such as IEEE standard 802.11ad, operate both uplink and downlink in the same frequency band. If the uplink is beam formed we then get the problems with robustness as described above. Further, for a pure downlink transmission like a file download or streaming, the only data in the uplink will be ACK/NAK messaging and possibly other types of feedback related to the transmissions, e.g., Channel Quality Indicator, CQI, messages or some other control messaging, as well as higher layer acknowledgements. This transmission will be of much lower rate than the downlink transmission which may be multi-Gbps or at least several 100 s of Mbps. Using uplink for mmW could therefore potentially be a waste of system resources since the link is dimensioned and optimized for very high data rates. Also, a small packet or data quantity transmitted via the uplink may cost much more energy than the corresponding transmission performed at lower frequencies.

To overcome these problems, published international patent application WO2013086164 proposes a method for establishment of a mmW link with uplink reporting via cellular (e.g. LTE) or mmW. Hence, it is proposed to rely on a cellular link, which is more reliable than the mmW, when setting up a mmW connection.

Furthermore, published international patent application WO2013086410 discloses a method where a user equipment has both mmW downlink and uplink capabilities, or only mmW downlink capabilities. The user equipments with only mmW downlink capabilities sends feedback information via a cellular system. The cellular system lower layers are used for mmW network control, connectivity and mobility management.

Hence, there is prior art suggesting using a comparably less volatile radio system for connection, for channel establishment, and/or for feedback. However, these disclosures do not go into detail about how such a solution may be implemented.

One problem that arises when using different radio access technologies for data transmission and feedback is the timing between downlink and uplink. WO2013086164 discusses that the mmW carrier is time aligned with LTE. However, it cannot be assumed that this is always the case.

Hence, there is still a need for further methods enabling reusing a different radio access technology, i.e., different from the radio access technology used in the downlink, as uplink feedback channel for example for mmW networks.

SUMMARY

The proposed idea is to introduce a new physical channel in the uplink of another radio access technology operating at lower frequencies, which does not have the low robustness, high system resource consumption, or energy cost disadvantage of the mmW band for small data transmissions as outlined above. An example could be to use LTE at carrier frequencies around 2 GHz for the uplink feedback of a mmW system.

According to one aspect, this disclosure proposes a method, performed in a wireless device supporting a first radio access technology and a second radio access technology, of transmitting uplink control messages relating to data received in the wireless device. The method comprises receiving a configuration message defining, in the first radio access technology, a Physical Fast Control Channel, PFCCH, for transmission of uplink control messages relating to data received in the wireless device using the second radio access technology and transmitting uplink control messages relating to data received using the second radio access technology on the Physical Fast Control Channel.

By defining a new uplink, UL, control channel for fast transmissions i.e. Physical Fast Control Channel, latency provided when mapping the UL feedback on the standard LTE channels will be avoided, because the time resolution of the Physical Fast Control Channel would typically be adapted to the data rate of the second radio access technology. In particular if we assume that the transmission time interval, TTI, and roundtrip time of a mmW system is considerably shorter than for LTE, which is typically the case when the second radio access technology supports higher data rates than the first radio access technology. Here, TTI refers to the duration of a complete transmission, including control signalling such as acknowledgements, on the radio link. Round-trip time (RTT), also called round-trip delay, is the time required for a signal pulse or packet to travel from a specific source to a specific destination and back again.

As one example the second radio access technology uses a higher carrier frequency than the first radio access technology, e.g., the first radio access technology is LTE and the second radio access technology is mmW system.

According to one aspect, the method of transmitting uplink control messages further comprises receiving information associated with reception of data using a second radio access technology in the wireless device. For example, the information comprises information regarding at least one time offset between reception using the second radio access technology and transmission using the first radio access technology. By receiving information about e.g. time offset between the different radio access techniques, the method is applicable even when the systems are not synchronized in time.

According to one aspect, the information comprises information about the maximum offset in time between a data reception using the second radio access technology and corresponding transmission of uplink control messages on the Physical Fast Control Channel. This can be used if the exact timing is not known or when the two systems are driven by different clocks, that may drift relative each other or if frame structures are not aligned (LTE frame length is not an integer multiple of mmW-system frame length). In this case, the wireless device has the freedom to transmit the uplink feedback earlier, i.e. before the maximum offset has expired, if feasible.

According to one aspect, the time resolution of the Physical Fast Control Channel is a fraction of the time resolution of an uplink control channel for transmission of uplink control messages relating to data transmitted to the wireless device using the first radio access technology. Hence, the UL feedback rate using the Physical Fast Control Channel is according to aspects much faster than a regular UL feedback rate of the first radio access technology.

According to another aspect, this disclosure proposes a method, performed in a second radio network module supporting a second radio access technology, of receiving uplink control messages. The method comprises transmitting data to a wireless device using the second radio access technology, and receiving, from a first radio network module supporting a first radio access technology, at least one control message relating to the transmitted data, the control message being received by the first radio network module on a Physical Fast Control Channel configured in the first radio access technology.

According to another aspect, this disclosure proposes a method, performed in a first radio network module supporting a first radio access technology, of handling uplink control messages relating to data transmissions using a second radio access technology.

The method comprises configuring, in the first radio access technology, a Physical Fast Control Channel for reception of uplink control messages relating to data transmissions using a second radio access technology. The method further comprises receiving, from a wireless device, on the configured Physical Fast Control Channel, at least one control message relating to data received by the wireless device, from a second radio network module supporting a second radio access technology, and forwarding control information comprised in the at least one received control message to the second radio network module.

According to another aspect, this disclosure proposes a wireless device supporting a first radio access technology and a second radio access technology, being configured to transmit uplink control messages corresponding to data received in the wireless device. The wireless device comprises a radio communication interface configured to communicate over the first radio access technology and over the second radio access technology, and processing circuitry. The processing circuitry is configured to cause the wireless device to receive a configuration message defining, in the first radio access technology, a Physical Fast Control Channel for transmission of uplink control messages relating to data received in the wireless device using a second radio access technology and to transmit, using the radio communication interface, uplink control messages relating to data received using the second radio access technology on the Physical Fast Control Channel.

According to another aspect, this disclosure proposes a first radio network module supporting a first radio access technology being configured to handle uplink control messages relating to a second radio access technology. The first radio network module comprises a radio communication interface configured to communicate with the wireless device using the first radio access technology, a communication interface configured for communication with a second radio network module supporting a second radio access technology, and processing circuitry. The processing circuitry is configured to cause the first radio network module to configure, in the first radio access technology, a Physical Fast Control Channel for transmission of uplink control messages relating to data transmissions using the second radio access technology, receive, using the radio communication interface, from a wireless device, on the configured Physical Fast Control Channel, at least one control message relating to data received by the wireless device, from the second radio network module supporting a second radio access technology, and forward, over the communication interface, control information comprised in the received control message to the second radio network module.

According to another aspect, this disclosure proposes a second radio network module supporting a second radio access technology being configured to receive uplink control messages via a first radio network module supporting a first radio access technology. The second radio network module comprises a radio communication interface configured to communicate with the wireless device using the second radio access technology, a communication interface configured for communication with a first radio network module supporting a first radio access technology and a processing circuitry. The processing circuitry is configured to cause the second radio network module to transmit data to a wireless device, using the radio communication interface and to receive, using the communication interface, from a first radio network module supporting a first radio access technology, at least one control message relating to the transmitted data, the control message being received by the first radio network module on a Physical Fast Control Channel configured in the first radio access technology.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

DETAILED DESCRIPTION

The general object or idea of embodiments of the present disclosure is to address at least one or some of the disadvantages of the prior art solutions described above as well as below. The various steps described below in connection with the figures should be primarily understood in a logical sense, while each step may involve the communication of one or more specific messages depending on the implementation and protocols used.

This disclosure proposes using the uplink of another radio access technology, for the uplink feedback of a downlink data transmission using a certain radio access technology. More particularly it is proposed to introduce e.g. in LTE, a new physical channel for transmission of uplink control messages for control of a second, typically more volatile, communication system.

In this application uplink feedback typically refer to the signaling needed to keep the downlink transmission running in a good way, e.g., ACK/NAK, CQI, power control commands, etc.

Taking a high carrier frequency transmission as described above as an example, the uplink feedback may be sent on a cellular system which is operating at lower carrier frequencies and which does not have the low robustness or high system resource or energy cost disadvantage of the mmW band for small data transmissions as outlined above. An example could be to use LTE around 2 GHz for the uplink feedback.

The disclosure is at least partly based on the assumption that for the uplink feedback one typically wants very low latency e.g. response time, such that optimization of transmission parameters can follow the channel variations e.g. Channel Quality Indication, CQI, and such that problems like filling retransmission buffers, TCP congestion and stalling are avoided. Therefore, it has been considered that mapping the uplink feedback on the standard LTE channels will typically provide too high latency. In particular if we assume that the Transmission Time Interval, TTI, and round-trip time of a mmW system is considerably shorter than for LTE.

Therefore, in this disclosure it is proposed to introduce a new physical control channel, in this application referred to as a Physical Fast Control Channel, for transmission of uplink control messages relating to data received in the wireless device using the second radio access technology. The Physical Fast Control Channel may be allocated with one or a few orthogonal frequency division multiplexing, OFDM, symbols in time and some OFDM subcarriers in frequency. Taking LTE as an example, the granularity of the Physical Fast Control Channel is according to aspects in the order of 70 µS, i.e. one OFDM symbol, compared to the 1 ms sub frame length used for LTE Physical Uplink Control Channel, PUCCH.

Figure 1A:
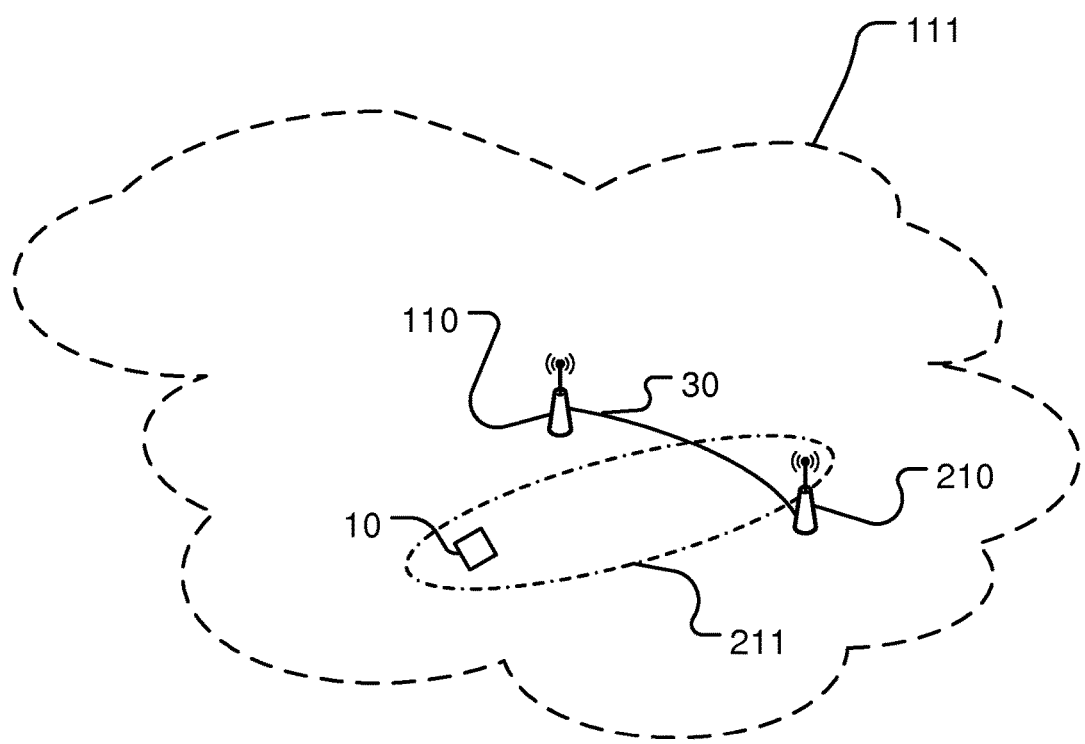
FIG. 1a illustrates a wireless network comprising a first radio network module operating over a first radio access technology and a second radio network module operating over a second radio access technology.

FIG. 1a illustrates a wireless network comprising first radio network module 110 operating over a first radio access technology and a second radio network module 210 operating over a second radio access technology. In this example the radio network modules 110,210 are typically comprised in two different base stations, which are connected over a backhaul 30.

Figure 1B:
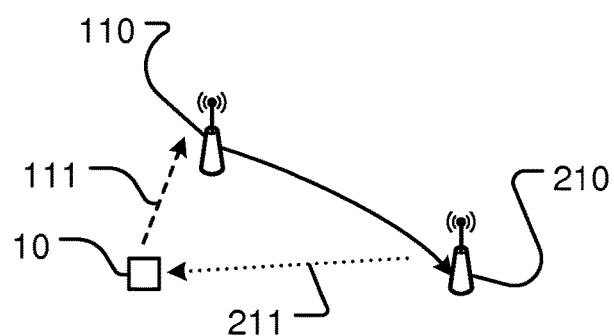
FIG. 1b shows using an uplink channel defined by the first radio network module as a feedback channel for downlink transmissions from the second radio network module.

FIG. 1b illustrates the principle of using an uplink channel 111 of the first radio network module 110 as a feedback channel for downlink transmissions 211 from the second radio network module 210. In this example a wireless device 10 is connected to a wireless network using a first radio access technology such as LTE. In the following, LTE will generally be used as an example of a first radio access technology. However, it must be appreciated that the method is also applicable to other access technologies such as one of LTE, HSPA, GPRS/EDGE, and GSM.

Generally it is assumed that the second radio access technology supports higher data rates than the first radio access technology. According to one aspect, the second radio access technology uses a higher carrier frequency than the first radio access technology. Then, the second radio access technology is typically a volatile system such as one comprised in a 5th generation cellular technology.

Figure 2:
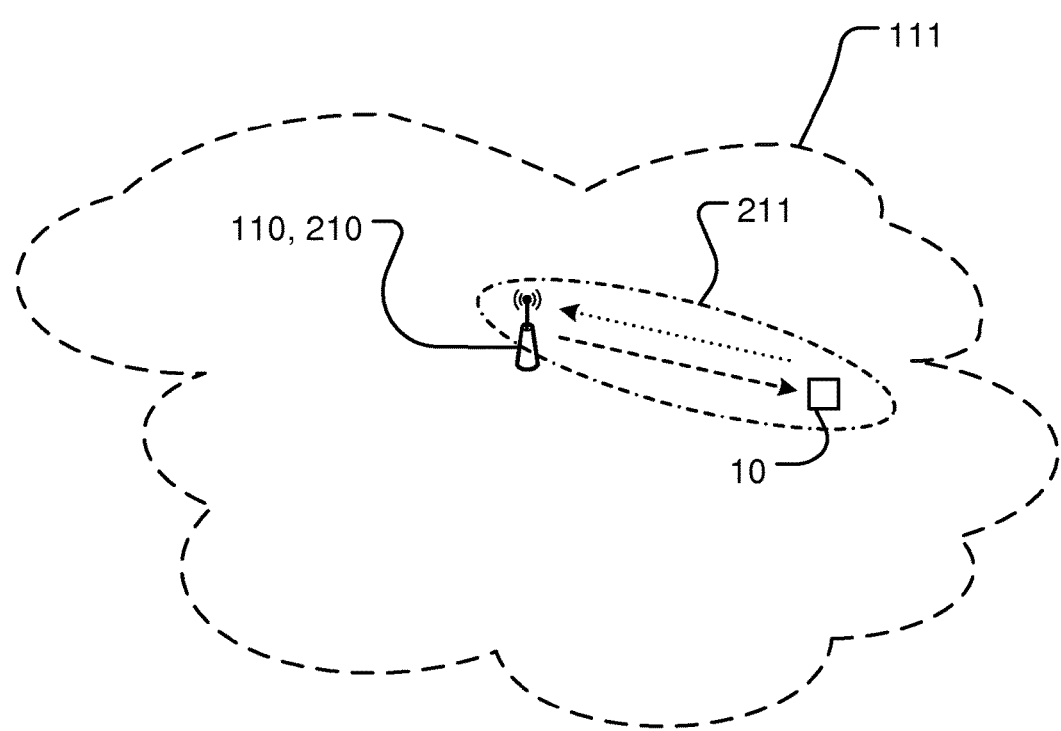
FIG. 2a illustrates a similar system, wherein the first and the second radio network modules are integrated in one base station.

FIG. 2 illustrates an alternative wherein the first radio network module 110 operating over a first radio access technology and a second radio network module 210 operating over a second radio access technology are comprised in one node 110, 210. The node 110, 210 is e.g. a base station or access point.

Figure 3:
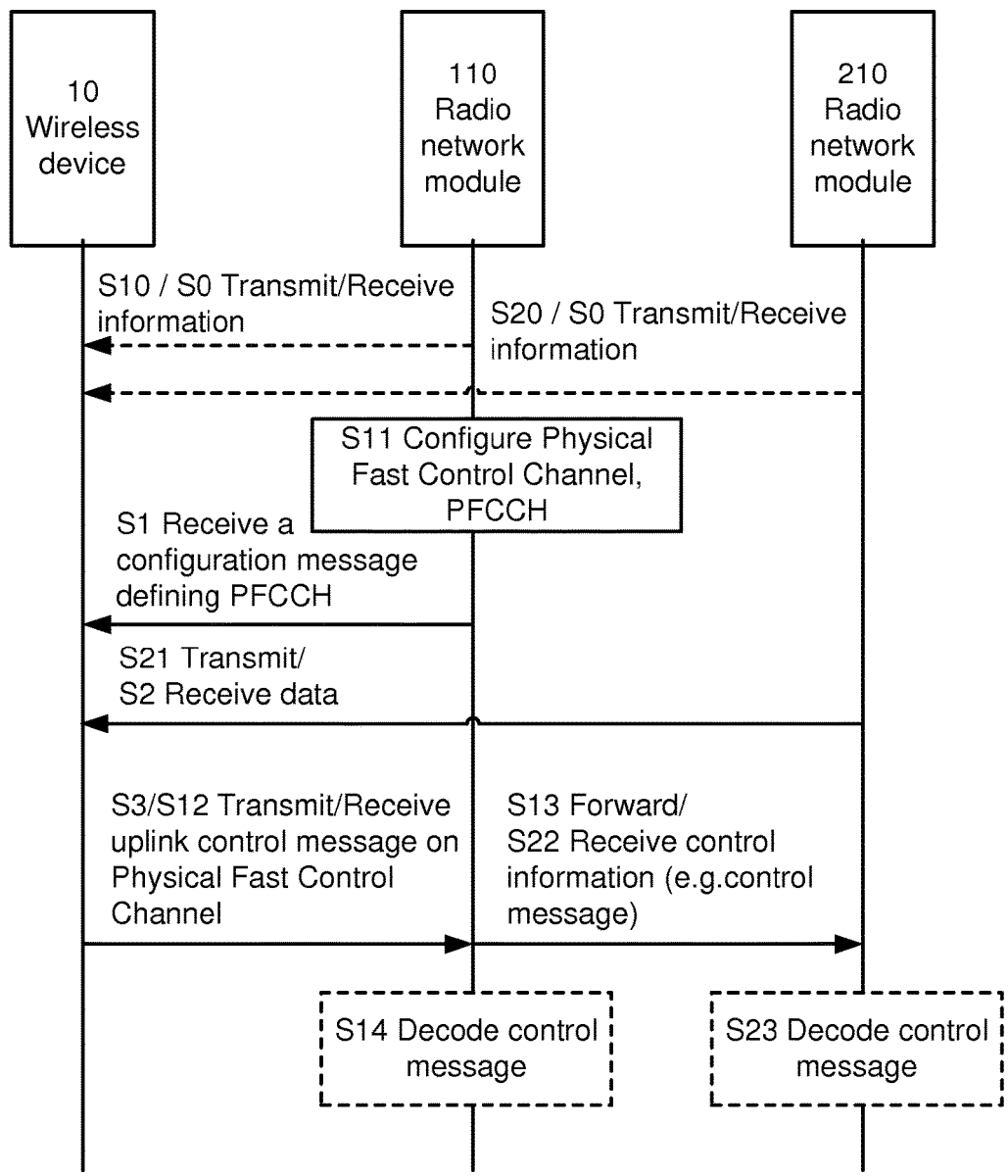
FIG. 3 illustrates an overview of the signaling in a system when enabling the proposed method of transmitting uplink control messages.

The method performed in a wireless device 10 of transmitting uplink control messages will now be described referring to FIGS. 3 and 4, wherein FIG. 3 illustrates an overview of the signaling in a system when enabling the proposed technique of transmitting uplink control messages.

Figure 4:
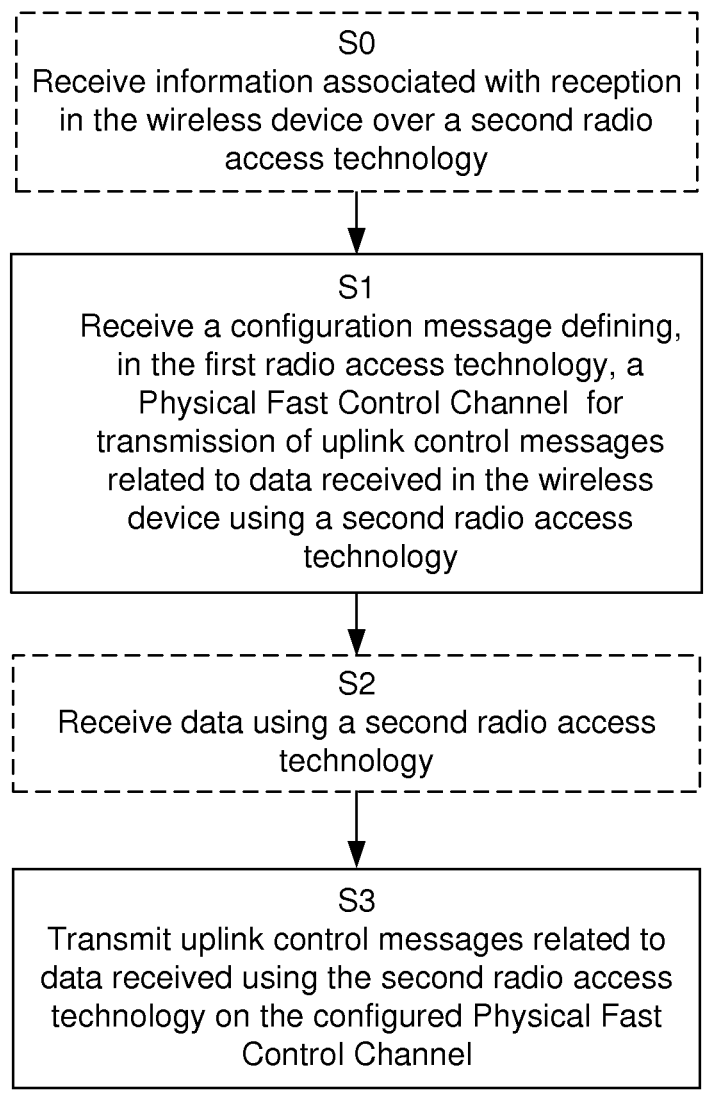
FIG. 4 is a flow chart illustrating the proposed methods performed in a wireless device when executing the proposed methods of transmitting uplink control messages.

FIG. 4 is a flow chart illustrating the proposed method performed in a wireless device when executing the proposed method of transmitting uplink control messages. The method is e.g. performed in a wireless device being served by an eNodeB. Hence, when starting the method the wireless device is connected to a network using LTE.

In this application the term wireless device is used in a general sense. A wireless device, or user equipment, UE, which is the term used in the 3GPP specifications, referred to in this application could be any wireless device capable of communicating with a wireless network. Examples of such devices are mobile phones, smartphones, laptops, sensors and Machine to Machine, M2M, devices. However, one must appreciate that capability to communicate with a wireless network could be built in almost any device e.g. a car, a lamp post, a scale and so on.

The proposed method, performed in a wireless device supporting a first radio access technology and a second radio access technology, of transmitting uplink control messages relating to data received in the wireless device comprises a number of steps, which steps will now be described referring to FIG. 4.

According to one aspect, the method is initialized by receiving in the wireless device 10 information associated with reception of data using a second radio access technology in the wireless device 10. In this step, the wireless device 10 is e.g. informed about the presence of a second wireless network implementing the second radio access technology. The wireless device, according to aspects, also receives other information required for communicating with this second wireless network. Hence, the device needs to be aware of the second radio access technology, but the first and the second radio access technologies do not need to be perfectly synchronized in time. However, if the technologies are not synchronized, timing information has to be provided to the wireless device. According to one aspect of the method, the information received in step S0 comprises information regarding at least one time offset between reception using the second radio access technology and transmission using the first radio access technology. This type of information is typically received over the first radio access technology, step S10 in FIG. 3, which is generally more stable that the second radio access technology, but may also be transmitted over the second radio access technology, step S20.

In the step S1 of the proposed method performed in the wireless device 10, the wireless device 10 receives a configuration message defining, in the first radio access technology, a Physical Fast Control Channel for transmission of uplink control messages relating to data received in the wireless device 10 using the second radio access technology. This step implies that a physical control channel is configured in the first radio access technology, step S11 of FIG. 3. The new channel is in this application referred to as a Physical Fast Control Channel. In cellular systems configuration of physical channels is typically performed by a radio network module in a base station. Hence, in this example, the first radio network module 110 configures the Physical Fast Control Channel and in this step the wireless device receives information typically from the first radio network module 110 defining the Physical Fast Control Channel that is to be used for transmission of uplink control messages relating to data received in the wireless device 10 using the second radio access technology. However, alternatively it would also be possible that the configuration message is received from the second radio network module 210, telling the wireless device 10 to use a Physical Fast Control Channel configured in the first radio access technology for transmission of uplink control messages. The wireless device 10 then takes measures required to prepare for transmission of control messages on the Physical Fast Control Channel.

For example, in LTE the eNodeB assigns uplink resources for control signaling. Hence, the Physical Fast Control Channel would typically also be assigned by the eNodeB. Such a channel is presently not in the LTE standard. The configuration message e.g. defines the Physical Fast Control Channel to use predetermined time and/or frequency resources. Because there is yet no official name for this type of channel, the term Physical Fast Control Channel should be interpreted as any channel for transmission of uplink control messages relating to data received in a wireless device using a radio access technology different form the radio access technology in which the channel is defined.

Then the wireless device 10 receives, S2, data transmitted S21 from the second radio network module using a second radio access technology. This may e.g. be a large file that is downloaded or streamed to the wireless device 10 using a directed beam. As explained above, it may then be advantageous to use the first radio access technology for feedback since the first radio access technology provides a more reliable uplink and since in some cases there is not enough transmit power for uplink in the second radio network module 220 and/or due to more reliable transmissions at the lower frequencies. For example, uplink feedback transmissions by the first radio access technology is, according to aspects, less energy consuming compared to uplink feedback transmissions using the second radio access technology. Using the first radio access technology may also make it possible to avoid wasting mmW system resources for the small data packets containing the uplink feedback.

Hence, in the third step, the wireless device 10 transmits S3 uplink control messages relating to data received using the second radio access technology on the Physical Fast Control Channel. The uplink control messages are received S12 by the first radio network module, for further distribution S13, S22 to the second network module. By introducing a new channel for uplink feedback the time resolution and resource allocation of the Physical Fast Control Channel may be adapted to the second radio access technology, whereby latency is reduced. In particular if we assume that the Transmission Time Interval, TTI, and roundtrip time of a second radio access technology system is considerably shorter than for the first radio access technology. Furthermore, using a channel which is used only for uplink resources increases the reliability of the UL channel.

The concept will now be described in more detail using LTE as an example. According to the proposed technique, a physical control channel associated with the mmW downlink physical channel, is introduced and labeled Physical Fast Control Channel or mmW PUCCH. The Physical Fast Control Channel is a new physical channel which should be seen as a complement to the Physical Uplink Control Channel, PUCCH, which is used for uplink control signalling within LTE.

Figure 7:
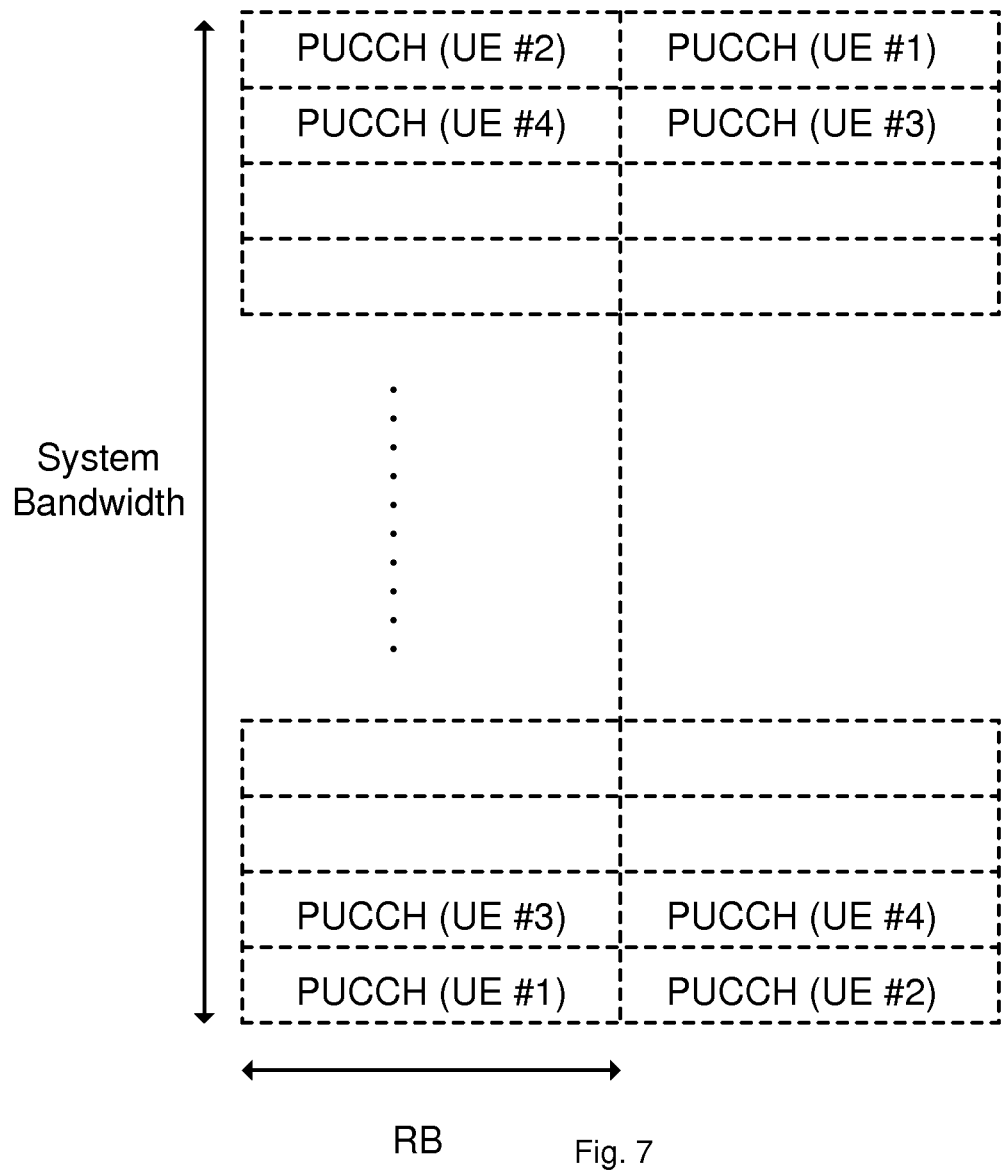
FIG. 7 illustrates a physical uplink control channel in LTE.

FIG. 7 shows the time/frequency resource grid for PUCCH of LTE. The PUCCH control signalling comprises uplink data transmitted independently of traffic data and includes HARQ ACK/NACK, channel quality indicators (CoI), MIMO feedback (Rank Indicator, RI; Precoding Matrix Indicator, PMI) and scheduling requests for uplink transmission. The PUCCH transmits in a frequency region at the edge of the system bandwidth as shown in FIG. 7. It consists of one Resource Block, RB, per transmission at one end of the system bandwidth followed by a RB in the following slot at the opposite end of the channel spectrum thus making use of frequency diversity with an estimated gain of 2 dB. A PUCCH Control Region comprises every two such RBs. One RB is defined as a block of 12 subcarriers and one slot i.e. 7 OFDM symbols.

Figure 8:
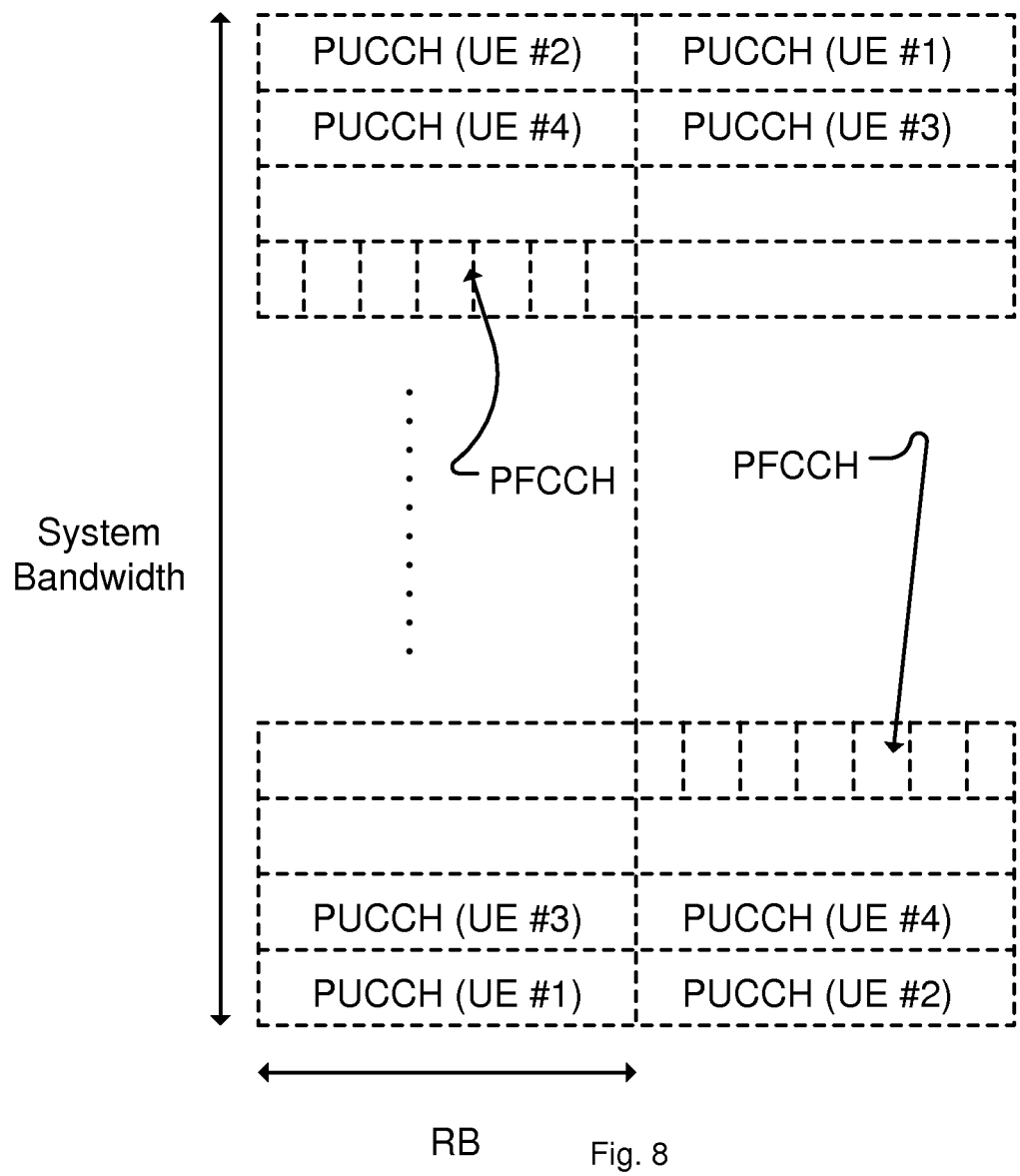
FIG. 8 illustrates an example embodiment of a Physical Fast Control Channel.

Because the second radio access technology supports higher data rates, the time resolution of the second radio access technology is generally higher than the time resolution of the first radio access technology. Therefore, according to one aspect of the disclosure, the time resolution of the Physical Fast Control Channel is a fraction of the time resolution of an uplink control channel for transmission of uplink control messages relating to data transmitted to the wireless device 10 using the first radio access technology. Taking LTE as an example, the Physical Fast Control Channel may be allocated one or a few OFDM symbols in time and some Resource Block, RB in frequency, f, as illustrated in FIG. 8. Hence, the granularity of the Physical Fast Control Channel is e.g. in the order of 70 µS, i.e. one OFDM symbol, compared to the 1 ms sub frame length used for LTE PUCCH.

The allocation of a Physical Fast Control Channel can be done in different ways. In some embodiments, only a fraction of one or more resource blocks are assigned to Physical Fast Control Channel. According to one aspect, the Physical Fast Control Channel and the ordinary uplink channel of the first radio access technology are scheduled on separate physical resources. The ordinary uplink channel of the first radio access technology i.e. an uplink control channel for transmission of uplink control messages relating to data transmitted to the wireless device 10 using a first radio access technology. In LTE the ordinary uplink channel of the first radio access technology is the Physical Uplink Control Channel, PUCCH or control information multiplexed on PUSCH.

Different users may be multiplexed by using different resource elements in time and/or frequency, or by using different codes i.e. using Code Division Multiple Access, CDMA, on overlapping resource elements. The access node will then not allocate any legacy LTE traffic on these resources. In other embodiments, the Physical Fast Control Channel resources overlap in time and/or frequency with legacy PUSCH or PUCCH, in which case any legacy LTE communication is masked and replaced by the PFCCH data.

Several options exist for designing the Physical Fast Control Channel, including reference symbols, using Single Carrier Frequency Division Multiple Access, FDMA, modulation as is currently used for the LTE uplink, or OFDM based multiple access, where reference signals may be allocated in any resource elements in the time-frequency grid.

Reference signals which are transmitted over a wireless link using legacy LTE uplink channels can be re-used by the access node also for channel estimation when receiving the Physical Fast Control Channel transmission. This reuse will be especially effective if the Physical Fast Control Channel is transmitted close to (in time and frequency) legacy LTE reference signals. Close in time or frequency is here defined in relation to the stability of the transmission channel in time or frequency, respectively.

If the user equipment has legacy uplink signals in addition to the Physical Fast Control Channel to transmit most likely the uplink single-carrier property will be broken resulting in higher cubic metric or peak-to-average power ratio, PAPR, and thus also potentially a larger power back off. However, if the user equipment is in mmW reach to the access node the user equipment will use low output powers where increased cubic metric and power back off are not problematic.

In one example embodiment, on the mmW-downlink an uplink Physical Fast Control Channel "exact" grant may be transmitted and the device hence knows exactly in which OFDM symbols to transmit the Physical Fast Control Channel. The Physical Fast Control Channel grant can either be explicitly signaled to the terminal or it can be implicitly derived from the mmW downlink assignment, either control or data. This embodiments assumes a perfect time sync between the LTE 2 GHz system and mmW-system, which may be known in case the both system are in the same base station or access point, as well as aligned frame structures between the systems.

In another example embodiment, on the mmW-downlink an "uplink-mmW at the latest" grant is transmitted giving indication on which OFDM symbol(s) the device should transmit at the latest. According to this aspect, the method comprises receiving information about the maximum offset in time between a data reception using the second radio access technology and corresponding transmission of uplink control messages on the Physical Fast Control Channel. This information may be received in several ways, either using the first or the second radio access technology.

This approach can be used if the exact timing is not known or when the two systems are driven by different clocks, that may drift relative each other or if frame structures are not aligned, e.g. LTE frame length is not an integer multiple of mmW-system frame length. In this case, the device has the freedom to transmit the Physical Fast Control Channel information earlier, if that is beneficial e.g. for low latency. A user equipment could also benefit from some freedom in time in order to optimize its processing resources. Especially considering that the PFCCH is running faster than the regular timing for the first radio access technology. For example, peak-to-average power ratio would be reduced for example if the user equipment could avoid simultaneous transmission on the uplink of the first radio access technology.

Since exact position of the PFCCH is not known, the first radio network module 110 then needs to do a search for the corresponding Physical Fast Control Channel, PFCCH, which can be distinguished from another scheduled Physical Fast Control Channel via, for instance, different scrambling. By using a user equipment specific scrambling sequence, the correct PFCCH can be found e.g. by correlating the scrambling sequence and data received on the PFCCH and if there is no match, then the data will be seen as noise. The first radio network module 110, i.e. the receiver operating in the first radio network technology typically has a quick interconnect, or backhaul 30, to the second radio network module 210 comprising the transmitter operating the second radio network technology, such that the feedback can be quickly reacted to triggering e.g. retransmissions of data.

Figure 5:
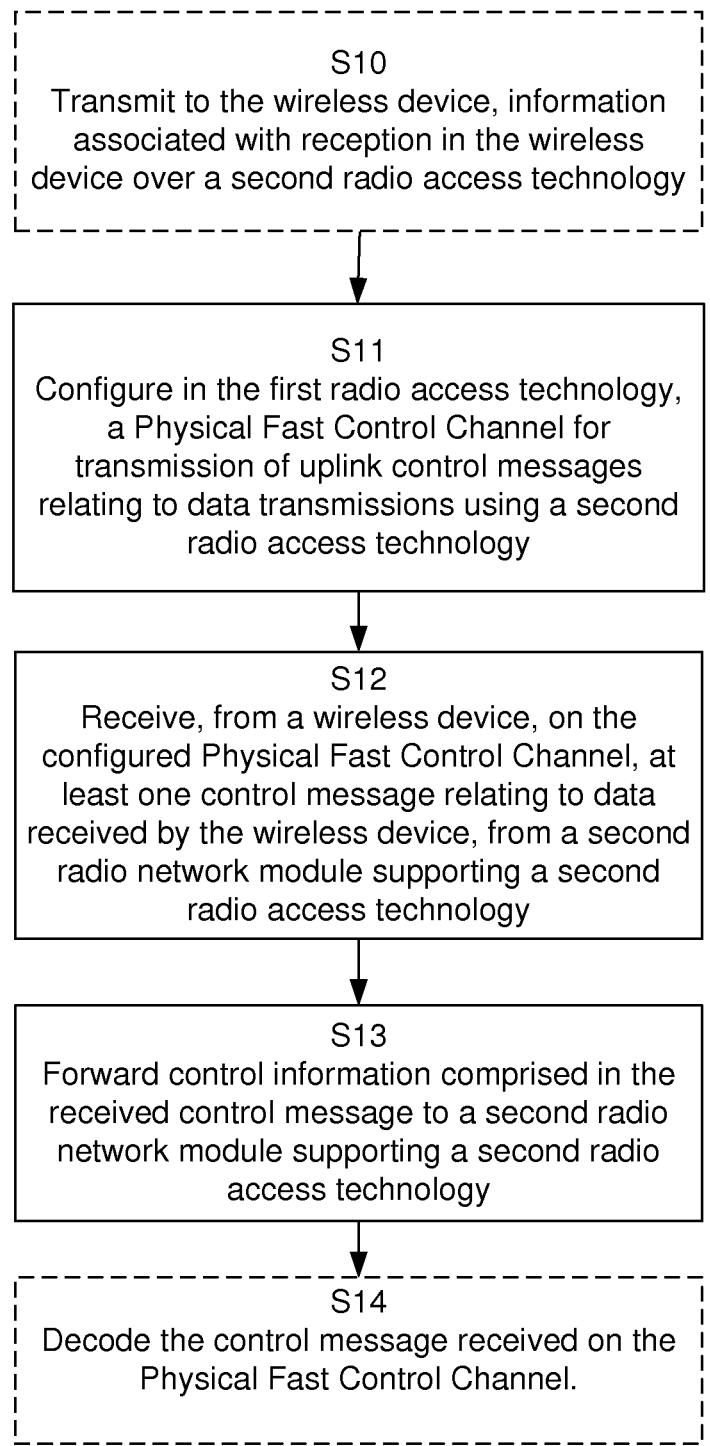
FIG. 5 is a flow chart illustrating the proposed methods performed in a first radio network module when executing the proposed methods of transmitting uplink control messages.

The corresponding method steps performed in the first network module 110 using a first radio access technology, i.e. the network module 110 forwarding uplink control messages will now be described referring to FIG. 5. FIG. 5 is a flow chart illustrating the proposed method performed in a first radio network module 110 supporting a first radio access technology, of handling uplink control messages relating to data transmissions using a second radio access technology.

In the first step, S11, the first radio network module configures, in the first radio access technology, a Physical Fast Control Channel for reception of uplink control messages relating to data transmissions using a second radio access technology. Hence, the radio network module 110 assigns resources for the Physical Fast Control Channel and prepares the receiver for reception of uplink control messages on this channel. The radio network module also informs the wireless device 10 about the configuration e.g. by transmission of a configuration message defining the PFCCH.

Then the first radio network module receives, S12, from a wireless device 10, on the configured Physical Fast Control Channel, at least one control message relating to data received by the wireless device 10, from a second radio network module 210 supporting a second radio access technology. The first radio network module knows that this control message corresponds to another network module. Thus, the first radio network module forwards S13 control information comprised in the at least one received control message to the second radio network module 210.

According to one aspect of the proposed method, the first radio network module decodes S14 at least one control message received on the Physical Fast Control Channel. If decoding is done in the first network module 110, then only the relevant information may be forwarded to the second network module 210. Alternatively, the message is forwarded to the second network module 210 without decoding. Then the message is e.g. decoded in the second radio access module.

According to one further aspect of the proposed method, which has already been described above, the first radio network module transmits S10 to the wireless device 10, information associated with reception of data using a second radio access technology in the wireless device 10. This is e.g. initiation information needed to establish communication with the second radio network module. According to one aspect the information is a downlink control message defining the Physical Fast Control Channel, as described above in connection to step S11. Hence, step S10 may be performed before the configuration S11, as well as after.

Figure 6:
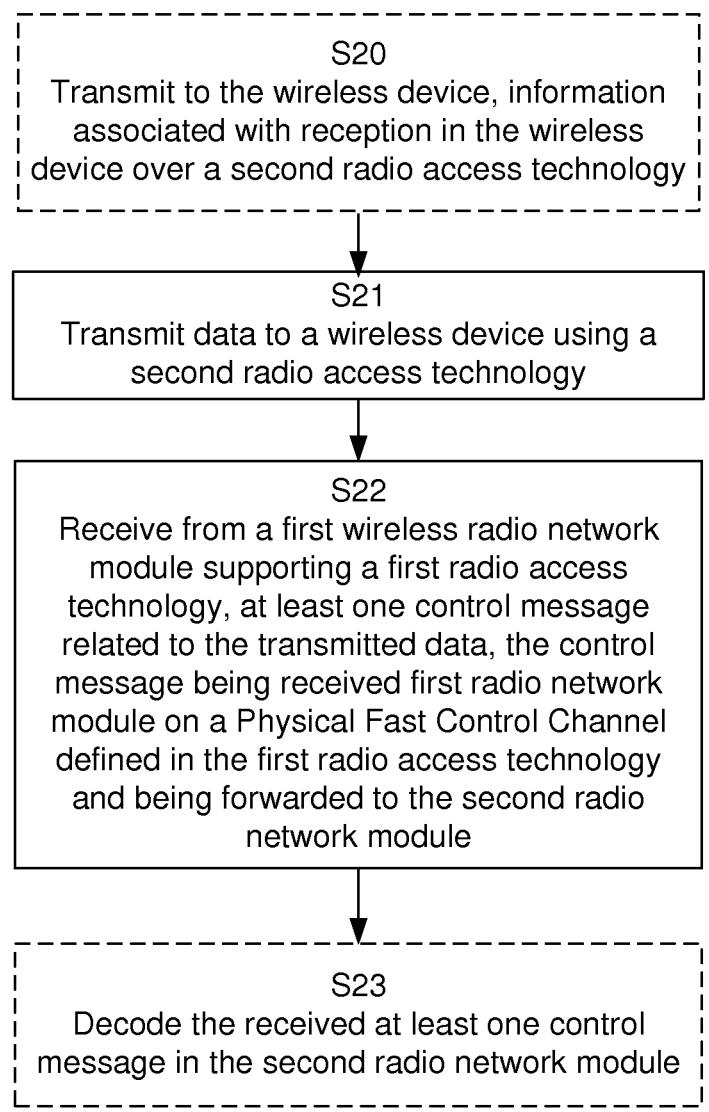
FIG. 6 is a flow chart illustrating the proposed methods performed in second network module in a second radio network module when executing the proposed methods of transmitting uplink control messages.

The corresponding method steps performed in the second network module 210 using a second radio access technology, i.e. the radio network module transmitting data according to a second radio access technology, will now be described referring to FIG. 6. FIG. 6 is a flow chart illustrating the proposed method performed in a second radio network module 210 supporting a second radio access technology, of receiving uplink control messages.

According to one aspect the second radio network module 210 transmits S20, as an initial step, to the wireless device, information associated with reception of data using a second radio access technology in the wireless device 10. As described above this is e.g. control data exchange before actual data transmission e.g. sync or latest point in time to transmit uplink control messages.

In the first step the second radio network module 210 transmits S21 data to a wireless device 10 using the second radio access technology. As mentioned above this is e.g. a beam formed transmission with high data rate, wherein a fast, yet stable feedback channel is preferred.

Then the second radio network module receives S22, from a first radio network module supporting a first radio access technology, at least one control message relating to the transmitted data, the control message being received by the first radio network module 110 on a Physical Fast Control Channel configured in the first radio access technology. If the first radio network module 110 and the second radio network module 210 are integrated into one node, then step S22 is then performed over an internal interface. i.e. sending the control data between different modules in one node.

According to one aspect the second radio network module decodes S23 the received at least one control message in the second radio network module. This implies decoding a control message received on the Physical Fast Control Channel. Thus the second radio network module 210 needs to be configured to interpret this type of messages.

According to one aspect the transmitted data comprises information about the latest point in time to transmit uplink control messages associated therewith on the Physical Fast Control Channel. This aspect can be used if the exact timing is not known or when the two systems are driven by different clocks, that may drift relative each other or if frame structures are not aligned, as further described above.

Figure 9:
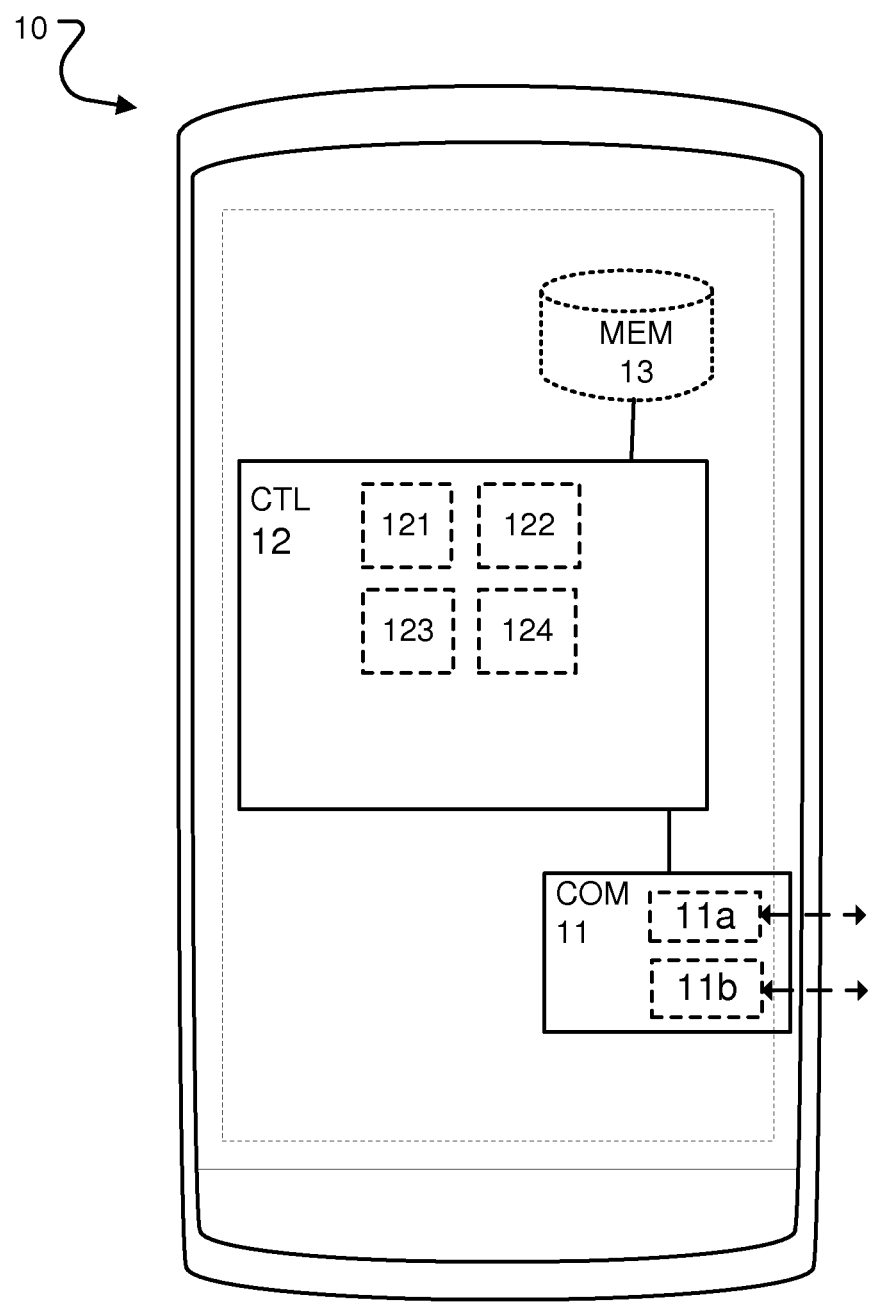
FIG. 9 is a schematic diagram illustrating a wireless device.

Turning now to FIG. 9, a schematic diagram illustrating some modules of an exemplary embodiment of a wireless device 10 supporting a first radio access technology and a second radio access technology, and being configured to transmit uplink control messages corresponding to data received in the wireless device 10, will be described. In this application a wireless device 10 is any wireless device able to wirelessly connect to the first and second radio network modules 110, 210. The wireless device is typically a user equipment, UE, such as a smartphone or a M2M device.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Random Access Memory, RAM, and a Read Only Memory, ROM. The memory 13 may also comprise persistent storage, which, for example, can be any single one or combination of magnetic memory, optical memory, or solid state memory or even remotely mounted memory.

The wireless device 10 further comprises a radio communication interface (i/f), COM 11. The radio communication interface 11 is arranged for wireless communication with wireless devices within range of the wireless device 10. The radio communication interfaces 11*a*, 11*b*, may be adapted to communicate over two or more radio access technologies. The radio communication interface 11 is at least configured to communicate with a first and a second wireless network module. If several technologies are supported, the node typically comprises several communication interfaces, e.g. one LTE interface 11*a* and 5G communication interface 11*b*.

According to one aspect the disclosure further relates to the above mentioned computer program, comprising computer readable code which, when run on a wireless device, causes the node to perform any of the aspects of the method described above. When the computer readable code is run in the processing circuitry 11 of the wireless device 10, it causes the wireless device 10 to receive a configuration message defining in the first radio access technology, a Physical Fast Control Channel for transmission of uplink control messages relating to data received in the wireless device using a second radio access technology and transmit, using the radio communication interface, uplink control messages relating to data received using the second radio access technology on the Physical Fast Control Channel.

According to one aspect of the disclosure the processing circuitry 12 comprises one or several of:
- a first receiver module 121 configured to receive a configuration message defining in the first radio access technology, a Physical Fast Control Channel for transmission of uplink control messages relating to data received in the wireless device (10) using a second radio access technology; and
- a transmitter module 122 configured to transmit, using the radio communication interface, uplink control messages relating to data received using the second radio access technology on the Physical Fast Control Channel using the first radio access technology According to one aspect the disclosure the processing circuitry 12 further comprises a second receiver module 123 configured to receive data in the wireless device 10 using a second radio access technology.

According to one aspect the disclosure the processing circuitry 12 further comprises a third receiver module 124 receiving information associated with reception of data using a second radio access technology in the wireless device 10.

The first, second and third receiver modules 121, 123, 124 and transmitter module 122 are implemented in hardware or in software or in a combination thereof. The modules 121, 122, 123, 124, are according to one aspect implemented as a computer program stored in a memory 13 which run on the processing circuitry 12. The wireless device 10 is further configured to implement all the aspects of the disclosure as described in relation to the methods above. The processing circuitry 12 also comprises the corresponding modules.

Figure 10A:
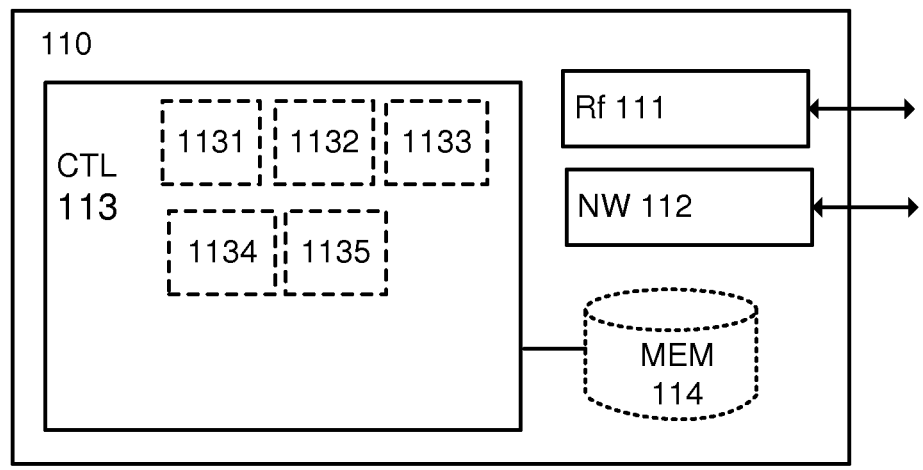
FIG. 10a is a schematic diagram illustrating a first radio network module.

Turning now to FIG. 10a, a schematic diagram illustrating some modules of an exemplary embodiment of a first radio network module 110 supporting a first radio access technology and being configured to handle uplink control messages relating to a second radio access technology, will be described. In this application the term radio network module is generally used. A radio network module is a hardware unit configured to communicate with wireless devices over a certain radio access technology e.g. LTE or a mmW access technology. It is anticipated that several radio network modules may be comprised in one node e.g. in a base station.

As mentioned above, the first and the second radio network modules 110, 210 may according to one aspect be integrated into one node. The modules may then be plug-in modules in a rack. However, it must also be anticipated that the different elements of the radio network modules e.g. the memories 114,214 or the controllers 113, 213 may be integrated into one component.

The first radio network module 110 comprises a controller, CTL, or a processing circuitry 113 that may be constituted by any suitable Central Processing Unit, CPU, microcontroller, Digital Signal Processor, DSP, etc. capable of executing computer program code. The computer program may be stored in a memory, MEM 114. The memory 114 can be any combination of a Random Access Memory, RAM, and a Read Only Memory, ROM. The memory 114 may also comprise persistent storage, which, for example, can be any single one or combination of magnetic memory, optical memory, or solid state memory or even remotely mounted memory.

The first radio network module 110 further comprises a radio, Rf, communication interface 111. The radio communication interface 111 is arranged for wireless communication with wireless devices 10 within range of the radio network module 110.

The first radio network module 110 further comprises a communication interface 112 configured to communicate with a second radio network module 210 supporting a second radio access technology.

According to one aspect the disclosure further relates to the above mentioned computer program, comprising computer readable code which, when run on an radio network module, causes the radio network module to perform any of the aspects of the method described above.

When the above-mentioned computer program code is run in the processing circuitry 12 of the first radio network module 110, it causes the first radio network module 110 to configure, in the first radio access technology, a Physical Fast Control Channel for transmission of uplink control messages relating to data transmissions using a second radio access technology and to receive, using the radio communication interface 111, from a wireless device 10, on the configured Physical Fast Control Channel, at least one control message relating to data received by the wireless device 10, from a second radio network module 210 supporting a second radio access technology. The first radio network module 110 is further caused to forward, over the communication interface 112, control information comprised in the received control message to the second radio network module 210.

According to one aspect the disclosure further relates to the above mentioned computer program, comprising computer readable code which, when run on an radio network module, causes the radio network module to perform any of the aspects of the method described above.

According to one aspect of the disclosure the controller comprises one or several of:
- a configurer 1131 adapted to configure in the first radio access technology, a Physical Fast Control Channel for reception of uplink control messages relating to data transmissions using a second radio access technology;
- a receiver module 1132 adapted to receive, using the radio communication interface 111, from a wireless device 10, on the configured Physical Fast Control Channel, at least one control message relating to data received by the wireless device 10, from a second radio network module 210 supporting a second radio access technology, and
- a forwarding module 1133 adapted to forward, over the communication interface 112, control information comprised in the at least one received control message to the second radio network module 210.

According to one aspect the first radio network module 110 is further adapted to transmit S10 to the wireless device, information associated with reception of data using a second radio access technology in the wireless device 10. According to one aspect the controller 113 comprises a transmitter module 1134 configured for this purpose.

According to one aspect the first radio network module 110 is further adapted to decode at least one control message received on the Physical Fast Control Channel. According to one aspect the controller 113 comprises a decoder module 1135 configured for this purpose.

The configurer 1131, the receiver module 1132, the forwarding module 1133, the transmitter module 1134 and the decoder module 1135 are implemented in hardware or in software or in a combination thereof. The modules 1131, 1132, 1133, 1134, 1135 are according to one aspect implemented as a computer program stored in the memory 114 which run on the processing circuitry 113. The first radio network module 110 is further configured to implement all the aspects of the disclosure as described in relation to the methods above.

Figure 10B:
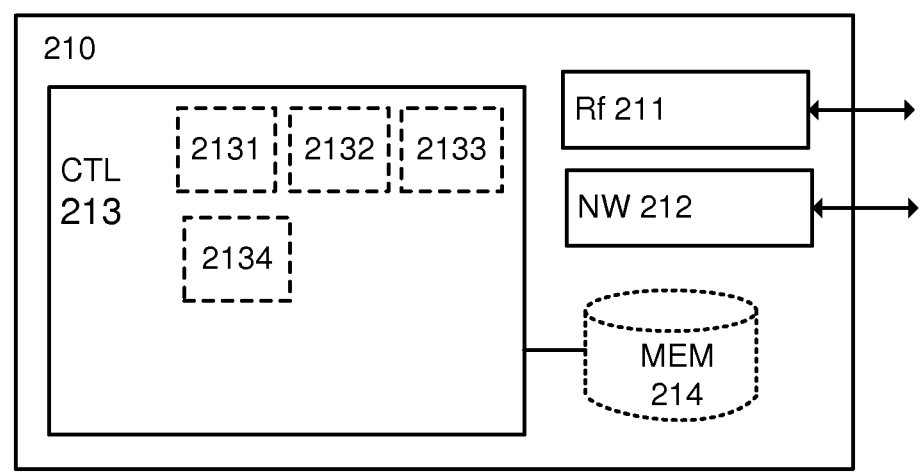
FIG. 10b is a schematic diagram illustrating a second radio network module.

Turning now to FIG. 10b, a schematic diagram illustrating an exemplary embodiment of a second radio network module 210 supporting a second radio access technology and being configured to receive uplink control messages via a first radio network module 110 supporting a first radio access technology, will be described.

The second radio network module 210 comprises a controller, CTL, or a processing circuitry 213 that may be constituted by any suitable Central Processing Unit, CPU, microcontroller, Digital Signal Processor, DSP, etc. capable of executing computer program code. The computer program may be stored in a memory, MEM 214. The memory 214 can be any combination of a Random Access Memory, RAM, and a Read Only Memory, ROM. The memory 214 may also comprise persistent storage, which, for example, can be any single one or combination of magnetic memory, optical memory, or solid state memory or even remotely mounted memory.

The second radio network module 210 further comprises a radio communication interface 211 configured to communicate with wireless devices 10 within reach of the second radio network module 210 using the second radio access technology.

The second radio network module 210 further comprises a communication interface 212 configured for communication with a first radio network module supporting a first radio access technology.

When the above-mentioned computer program code is run in the processing circuitry 213 of the second radio network module 210, it causes the second radio network module 210 to transmit data to a wireless device 10, using the radio communication interface 211, and receive, using the communication interface 212, from a first radio network module 110 supporting a first radio access technology, at least one control message relating to the transmitted data, the control message being received by the first radio network module 110 on a Physical Fast Control Channel configured in the first radio access technology.

According to one aspect of the disclosure the controller 213 comprises one or several of:
a transmitter module 2131 configured to transmit, using the radio communication interface 211, data to a wireless device 10 using the second radio access technology, and
a receiver module 2132 configured to receive, using the communication interface 212, from a first radio network module supporting a first radio access technology, at least one control message relating to the transmitted data, the control message being received by the first radio network module 110 on a Physical Fast Control Channel configured in the first radio access technology.

According to one aspect the second radio network module 210 is further adapted to decode the received at least one control message in the second radio network module. According to one aspect the controller 213 comprises a decoder module 2133 configured for this purpose.

According to one aspect the second radio network module 210 is further adapted to transmit to the wireless device, information associated with reception of data using a second radio access technology in the wireless device. According to one aspect the controller 213 comprises a transmitter module 2134 configured for this purpose.

The transmitter module 2131, the receiver module 2132, the decoder module 2133 and the transmitter module 2134 are implemented in hardware or in software or in a combination thereof. The modules 2131, 2132, 2133, 2134 are according to one aspect implemented as a computer program stored in the memory 214 which run on the processing circuitry 213. The second radio network module 210 is further configured to implement all the aspects of the disclosure as described in relation to the methods above.

According to one aspect the disclosure further relates to the above mentioned computer program, comprising computer readable code which, when run on radio network module, causes the radio network module to perform any of the aspects of the method described above.

The invention claimed is:

1. A method, performed in a wireless device supporting a first radio access technology and a second radio access technology, of transmitting uplink control messages relating to data received by the second radio access technology in the wireless device, the method comprising the steps:
receiving a configuration message defining, in the first radio access technology, a Physical Fast Control Channel for transmission of uplink control messages relating to data received in the wireless device using the second radio access technology; and
transmitting uplink control messages relating to data received using the second radio access technology on the Physical Fast Control Channel,
wherein the second radio access technology is configured with a transmission time interval (TTI) that is a fraction of a time resolution of the first radio access technology; and
a time resolution of the Physical Fast Control Channel is a fraction of a time resolution of an uplink control channel for transmission of uplink control messages relating to data transmitted to the first radio access technology of the wireless device.

2. The method of transmitting uplink control messages according to claim 1, wherein the second radio access technology supports higher data rates than the first radio access technology.

3. The method of transmitting uplink control messages according to claim 1, wherein the second radio access technology uses a higher carrier frequency than the first radio access technology.

4. The method of transmitting uplink control messages according to claim 1, further comprising the step of:
receiving data in the wireless device using the second radio access technology.

5. The method of transmitting uplink control messages according to claim 1, wherein the Physical Fast Control Channel is configured to use a predetermined time and/or a frequency resource.

6. The method of transmitting uplink control messages according to claim 1, further comprising the step:
receiving control information associated with reception of data using the second radio access technology in the wireless device.

7. The method of transmitting uplink control messages according to claim 6, wherein the control information comprises information regarding at least one time offset between reception using the second radio access technology and transmission using the first radio access technology.

8. The method of transmitting uplink control messages according to claim 6, wherein the control information comprises information about the maximum offset in time between a data reception using the second radio access technology and corresponding transmission of uplink control messages on the Physical Fast Control Channel.

9. The method of transmitting uplink control messages according to claim 1, wherein the Physical Fast Control Channel and an uplink control channel for transmission of uplink control messages relating to data transmitted to the wireless device using the first radio access technology are scheduled on separate physical resources.

10. The method of claim 1, wherein the first radio access technology is one of LTE, HSPA, GPRS/EDGE.

11. The method of transmitting uplink control messages according to claim 1, wherein the second radio access technology is a 5th generation cellular technology.

12. A method of receiving uplink control messages performed in a second radio network module supporting a second radio access technology, the method comprising the steps:
  transmitting data to a wireless device using the second radio access technology; and
  receiving, from a first radio network module supporting a first radio access technology, at least one control message relating to the transmitted data, the control message being received by the first radio network module on a Physical Fast Control Channel configured in the first radio access technology,
  wherein the second radio access technology is configured with a transmission time interval (TTI) that is a fraction of a time resolution of the first radio access technology; and
  a time resolution of the Physical Fast Control Channel is a fraction of a time resolution of an uplink control channel for transmission of uplink control messages relating to data transmitted to the first radio access technology of the wireless device.

13. The method of receiving uplink control messages according to claim 12, further comprising:
  decoding the received at least one control message in the second radio network module.

14. The method of receiving uplink control messages according to claim 12, further comprising:
  transmitting to the wireless device, control information associated with reception of data using the second radio access technology in the wireless device.

15. The method of receiving uplink control messages according to claim 12, wherein the transmitted data or the control information comprises information about the latest point in time to transmit uplink control messages associated therewith on the Physical Fast Control Channel.

16. A method performed in a first radio network module supporting a first radio access technology, wherein the method is a method of handling uplink control messages relating to data transmissions using a second radio access technology, the method comprising the steps:
  configuring in the first radio access technology, a Physical Fast Control Channel for reception of uplink control messages relating to data transmissions performed using the second radio access technology;
  receiving, from a wireless device, on the configured Physical Fast Control Channel, at least one control message relating to data received by the wireless device, from a second radio network module supporting the second radio access technology; and
  forwarding control information comprised in the at least one received control message to the second radio network module,
  wherein the second radio access technology is configured with a transmission time interval (TTI) that is a fraction of a time resolution of the first radio access technology; and
  a time resolution of the Physical Fast Control Channel is a fraction of a time resolution of an uplink control channel for transmission of uplink control messages relating to data transmitted to the first radio access technology of the wireless device.

17. The method of handling uplink control messages according to claim 16, further comprising:
  transmitting to the wireless device, control information associated with reception of data using the second radio access technology in the wireless device.

18. The method of handling uplink control messages according to claim 17, wherein the control information comprises a downlink control message defining the Physical Fast Control Channel.

19. The method of handling uplink control messages according to claim 16, further comprising:
  decoding at least one control message received on the Physical Fast Control Channel.

20. A nontransitory computer readable storage medium comprising computer readable code which, when run in a second radio network module supporting a second radio access technology, causes the second radio network module to perform a method of receiving uplink control messages, the method comprising the steps:
  transmitting data to a wireless device using the second radio access technology; and
  receiving, from a first radio network module supporting a first radio access technology, at least one control message relating to the transmitted data, the control message being received by the first radio network module on a Physical Fast Control Channel configured in the first radio access technology,
  wherein the second radio access technology is configured with a transmission time interval (TTI) that is a fraction of a time resolution of the first radio access technology; and
  a time resolution of the Physical Fast Control Channel is a fraction of a time resolution of an uplink control channel for transmission of uplink control messages relating to data transmitted to the first radio access technology of the wireless device.

21. A wireless device supporting a first radio access technology and a second radio access technology, being configured to transmit uplink control messages corresponding to data received by the second radio access technology in the wireless device, the wireless device comprising:
  a radio communication interface configured to communicate over the first radio access technology and over the second radio access technology, and
  processing circuitry configured to cause the wireless device to;
    receive a configuration message defining, in the first radio access technology, a Physical Fast Control Channel for transmission of uplink control messages relating to data received in the wireless device using the second radio access technology; and
    transmit, using the radio communication interface, uplink control messages relating to data received using the second radio access technology on the Physical Fast Control Channel, wherein the second radio access technology is configured with a transmission time interval (TTI) that is a fraction of a time resolution of the first radio access technology; and a time resolution of the Physical Fast Control Channel is a fraction of a time resolution of an uplink control channel for transmission of uplink control messages relating to data transmitted to the first radio access technology of the wireless device.

22. A first radio network module supporting a first radio access technology being configured to handle uplink control messages relating to data transmissions using a second radio access technology, the first radio network module comprising:

a radio communication interface configured to communicate with a wireless device using the first radio access technology, a communication interface configured for communication with a second radio network module supporting the second radio access technology, and processing circuitry configured to cause the first radio network module to:

configure, in the first radio access technology, a Physical Fast Control Channel for transmission by the wireless device of uplink control messages relating to data transmissions performed using the second radio access technology;

receive, using the radio communication interface, from the wireless device, on the configured Physical Fast Control Channel, at least one control message relating to data received by the wireless device, from the second radio network module supporting the second radio access technology, and forward, over the communication interface, control information comprised in the received control message to the second radio network module, wherein the second radio access technology is configured with a transmission time interval (TTI) that is a fraction of a time resolution of the first radio access technology; and a time resolution of the Physical Fast Control Channel is a fraction of a time resolution of an uplink control channel for transmission of uplink control messages relating to data transmitted to the first radio access technology of the wireless device.

23. A second radio network module supporting a second radio access technology being configured to receive uplink control messages via a first radio network module supporting a first radio access technology, the second radio network module comprising:

a radio communication interface configured to communicate with a wireless device using the second radio access technology, a communication interface configured for communication with the first radio network module supporting the first radio access technology, and a processing circuitry configured to cause the second radio network module to:

transmit data to the wireless device, using the radio communication interface; and receive, using the communication interface, from the first radio network module supporting the first radio access technology, at least one control message relating to the transmitted data, the control message being received by the first radio network module on a Physical Fast Control Channel configured in the first radio access technology, wherein the second radio access technology is configured with a transmission time interval (TTI) that is a fraction of a time resolution of the first radio access technology; and a time resolution of the Physical Fast Control Channel is a fraction of a time resolution of an uplink control channel for transmission of uplink control messages relating to data transmitted to the first radio access technology of the wireless device.

* * * * *